United States Patent
Harris et al.

(10) Patent No.: US 7,118,026 B2
(45) Date of Patent: *Oct. 10, 2006

(54) APPARATUS, METHOD, AND SYSTEM FOR POSITIVELY IDENTIFYING AN ITEM

(75) Inventors: Richard Hunter Harris, Raleigh, NC (US); Lawrence Arthur Heyl, Raleigh, NC (US); Jonathan Hudson Connell, II, Cortlandt-Manor, NY (US); Hollis Phillip Posey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/608,872

(22) Filed: Jun. 26, 2003

(65) Prior Publication Data

US 2004/0262391 A1 Dec. 30, 2004

(51) Int. Cl.
*G06F 17/00* (2006.01)
*G06K 15/00* (2006.01)
*G06K 7/10* (2006.01)

(52) U.S. Cl. .............. 235/375; 235/378; 235/462.01; 186/59; 186/61; 705/16; 382/183

(58) Field of Classification Search ........... 235/462.24, 235/462.41, 375, 378, 385, 440, 462.31, 235/462.01; 382/181; 186/59, 61
See application file for complete search history.

(56) References Cited

U.S. PATENT DOCUMENTS

| | | | |
|---|---|---|---|
| 4,514,622 A * | 4/1985 | Wevelsiep et al. .......... 382/181 |
| 4,929,819 A * | 5/1990 | Collins, Jr. ................. 235/383 |
| 5,115,888 A | 5/1992 | Schneider .................... 186/61 |
| 5,168,961 A | 12/1992 | Schneider .................... 186/52 |
| 5,418,354 A | 5/1995 | Halling et al. .............. 235/383 |
| 5,426,282 A * | 6/1995 | Humble ....................... 235/383 |
| 5,494,136 A * | 2/1996 | Humble ....................... 186/61 |
| 5,497,314 A * | 3/1996 | Novak ......................... 705/17 |
| 5,557,088 A | 9/1996 | Shimizu et al. ............. 235/383 |
| 5,609,223 A * | 3/1997 | Iizaka et al. ................. 186/61 |
| 5,679,941 A * | 10/1997 | Iizaka et al. ............... 235/383 |
| 5,852,803 A * | 12/1998 | Ashby et al. ............... 704/270 |
| 5,900,614 A | 5/1999 | Nakakawaji et al. ... 235/462.14 |
| 5,945,656 A * | 8/1999 | Lemelson et al. ..... 235/462.01 |
| 5,979,753 A | 11/1999 | Roslak ....................... 235/380 |

(Continued)

FOREIGN PATENT DOCUMENTS

WO    WO 03/005313    1/2003

*Primary Examiner*—Daniel Walsh
(74) *Attorney, Agent, or Firm*—Kunzler & Associates

(57) ABSTRACT

A system, such as a checkout station, for positively identifying items includes a reader that reads coded information affixed to an item. The system further includes a capture module, such as a camera. The capture module captures a visual characteristic of the item to be identified, such as the color, size, shape, or texture of the item. The visual characteristic of the item is compared with visual characteristics of candidate items stored within a database. If multiple items within the database are associated with the item to be identified, the images of the candidate items may be displayed to a user. The user may then select the candidate item that most resembles the item to be identified. The coded information of the item being identified is then compared with coded information of the selected item within the database. If the coded information of both items corresponds, the item is positively identified and is accepted for purchase by a consumer.

22 Claims, 5 Drawing Sheets

U.S. PATENT DOCUMENTS

| | | |
|---|---|---|
| 5,987,428 A | 11/1999 | Walter .................. 705/23 |
| 5,992,570 A | 11/1999 | Walter et al. .............. 186/36 |
| 6,105,866 A | 8/2000 | Morrison et al. .......... 235/383 |
| 6,167,381 A * | 12/2000 | Swaine et al. ............. 705/17 |
| 6,179,206 B1 | 1/2001 | Matsumori ............... 235/383 |
| 6,260,023 B1 * | 7/2001 | Seevers et al. ............. 705/20 |
| 6,363,366 B1 | 3/2002 | Henty ..................... 705/400 |
| 6,366,696 B1 * | 4/2002 | Hertz et al. ............... 382/183 |
| 6,497,367 B1 * | 12/2002 | Conzola et al. ........ 235/462.45 |
| 6,592,033 B1 * | 7/2003 | Jennings et al. ........... 235/385 |
| 6,640,214 B1 * | 10/2003 | Nambudiri et al. ......... 705/26 |
| 6,768,815 B1 * | 7/2004 | Woodall .................. 382/162 |
| 2002/0088860 A1 * | 7/2002 | Entwistle .............. 235/462.45 |
| 2002/0138374 A1 * | 9/2002 | Jennings et al. ............ 705/29 |
| 2002/0194074 A1 * | 12/2002 | Jacobs ..................... 705/16 |
| 2003/0034392 A1 * | 2/2003 | Grimm et al. ............. 235/385 |
| 2003/0059088 A1 * | 3/2003 | Culp et al. ................ 382/104 |
| 2003/0189098 A1 * | 10/2003 | Tsikos et al. ............. 235/454 |
| 2004/0065740 A1 * | 4/2004 | Mergenthaler et al. 235/462.14 |
| 2004/0118916 A1 * | 6/2004 | He ......................... 235/383 |
| 2004/0118920 A1 * | 6/2004 | He ......................... 235/454 |
| 2004/0129783 A1 * | 7/2004 | Patel ....................... 235/454 |
| 2004/0155110 A1 * | 8/2004 | Ehrhart et al. ............ 235/469 |
| 2004/0223663 A1 * | 11/2004 | Cato ....................... 382/318 |
| 2006/0074861 A1 * | 4/2006 | Wilensky ................... 707/3 |
| 2006/0086794 A1 * | 4/2006 | Knowles et al. ........... 235/454 |

* cited by examiner

APPARATUS, METHOD, AND SYSTEM FOR POSITIVELY IDENTIFYING AN ITEM

BACKGROUND OF THE INVENTION

1. The Field of the Invention

The invention relates to devices, methods, and systems for improving customer service and reducing theft within a retail establishment. Specifically, the invention relates to devices, methods, and systems for properly identifying items within a retail establishment or the like.

2. The Relevant Art

Modern retail stores such as supermarkets generally have checkout lanes with equipment that optically scans coded identifiers affixed to the products being purchased. One example of a coded identifier that is commonly used by retail stores is a bar code. Bar codes are read by scanning equipment using reflected light to identify a coded identifier associated with an item.

Some of the checkout lanes may be designated for self-checkout. These permit a purchaser to self-scan his or her purchases substantially unattended. Self-checkout equipment reduces the number of store personnel required to check-out customers. Supermarkets especially view self-checkout as desirable because these stores are particularly sensitive to labor costs due to their typically low profit margins.

For most efficient operation, checkout systems use bar codes affixed to all items for sale in the store. Bar codes reduce the time a customer may have to wait to complete a purchase. Store personnel, or customers at self-checkout stations, quickly scan the bar code, and information about the item is instantly retrieved. The information may include the price, the name, the size, or other such information about the item.

Additionally, bar codes help stores keep an accurate record of inventory. Each time a bar code is scanned, an inventory record within a database may be updated. The update may include how many times during a day a particular bar coded item is scanned. Store personnel are able to tally purchases of certain items and take necessary action to maintain a proper inventory within the store.

Of course, bar codes are not the only form of coded identifiers. For example, coded identifiers may include magnetic tags. Magnetic tags may provide information such as the price of the item. Magnetic readers read the coded information from the magnetic tags and provide the information to store personnel, or to consumers at self-checkout stations.

Unfortunately, bar codes and other coded identifiers are fallible. A consumer may detach a bar code from an inexpensive item and affix the bar code over, or in place of, the bar code of a more expensive item. The consumer can then proceed to the checkout area and scan the item using the incorrect bar code. The pricing information is processed for a less expensive item, while the consumer leaves the store with the more expensive item. This form of theft can occur at self-checkout stations as well as regular checkout stations.

Alternatively, a consumer may practice "sweet hearting." When "sweet hearting," a consumer collaborates with an employee operating the checkout station. The employee scans a low price item such as a pack of gum, and a high priced item such as a package of steaks is then placed in the consumer's grocery bag in place of the gum. "Sweet hearting" may also take place at self-checkout stations. A consumer may scan items to avoid suspicion, while placing items that are more expensive in his/her bag without scanning the bar codes of the expensive items.

FIG. 1 illustrates a conventional item identification system 100. Generally, the system 100 provides rapid identification of items 102 to facilitate checking a customer out at a retail point of sale. The system 100 provides pricing information for the items 102.

Each item 102 is marked with a unique coded identifier 104 such as a bar code symbol. A reader 106 optically recognizes the coded identifier 104. Generally, the reader 106 is installed at a point of sale station 108 such as a checkout station of a retail establishment. Other types of readers 106 such as portable units are also used for scanning coded identifiers 104 on irregular shaped or sized items 102.

To use the system 100, an item 102 is passed in close proximity to the reader 106. The reader 106 reads the coded identifier 104 using well known reflected light technology. The reader 106 communicates the coded identifier 104 to a controller 110 over a network connection 112, a cable, or another type of communication link. The controller 110 consults a database 114 for information associated with the coded identifier 104. That is, a match is made with an entry on a list 116 of coded identifiers 104. A variety of information associated with the coded identifier 104 may be stored in the database. The information may include a name for the item 102, a price for the item 102, a weight for the item 102, or the like.

If the coded identifier 104 is found in the list 116, the controller 110 communicates the information associated with the coded identifier 104 to a processor (not shown) that maintains a running total and handles a customer's transaction. In addition, the controller 110 communicates with an output device 118. Generally, if the item 102 is positively identified using the coded identifier 104, the controller 110 signals the output device 118 to produce an audible tone. If the item 102 is not positively identified using the coded identifier 104, the controller 110 signals the output device 118 to produce a different audible tone.

For clarity, only the basic operations of the reader 106, controller 110, database 114, and output device 118 have been described. Those of skill in the art will recognize a number of variations to a conventional system 100 beyond those described herein. For example, the database 114 and controller 110 may be remote or local in relation to the reader 106.

Conventional item identification systems 100 continue to have several problems. The system 100 relies on properly reading a coded identifier 104. If a coded identifier 104 is damaged or missing, generally an operator must manually enter a price for the item 102. In addition, because the system 100 relies on the coded identifier 104 to look up the correct price information, the system 100 may be fooled.

While some coded identifiers 104 are permanently affixed to a respective item 102, as discussed above, a customer may replace the coded identifier 104 with a coded identifier 104 from a different item 102 having a lower price. Consequently, the controller 110 may incorrectly associate the item 102 with the coded identifier 104 for the different item 102 and register the lower price. In this manner, a customer may get the higher priced item for the lower price and defraud the system 100.

What is needed is an apparatus, method, and system to accurately and positively identify items in order to improve identification and reduce occurrences of fraud as previously described. The apparatus, method, and system may function in conjunction with checkout stations that are operated by store personnel, or at self-checkout stations.

SUMMARY OF THE INVENTION

The various elements of the present invention have been developed in response to the present state of the art, and in particular, in response to the problems and needs in the art that have not yet been fully solved by currently available item identification systems. Accordingly, the present invention provides an improved apparatus, method, and system for positively identifying items.

In one aspect of the present invention, an apparatus for positively identifying an item includes a reader configured to read a coded identifier associated with the item, such as a bar code, a capture module configured to capture a visual characteristic of the item, an association module configured to associate the visual characteristic with a candidate item in a database, and a verification module configured to verify that the candidate item is associated with the coded identifier. In one embodiment, the database is configured to associate the visual characteristic with the candidate item and the coded identifier. The visual characteristic of the item may comprise the color, size, shape, or texture of an item.

In selected embodiments, the apparatus further includes a confirmation module configured to confirm with a user that the candidate item is associated with the item. This facilitates a user positively identifying the item from a plurality of candidate items. In one embodiment, a presentation module is configured to present to the user the plurality of candidate items associated with the visual characteristic of the item. In another embodiment, a notification module is configured to notify the user whether the coded identifier is associated with the candidate item. The apparatus may further include a weight module configured to identify and associate the weight of the item with the weight of the candidate item.

In another aspect of the present invention, a method for positively identifying items includes reading a coded identifier associated with an item, capturing a visual characteristic of the item, associating the visual characteristic with a candidate item in a database, and verifying that the candidate item is associated with the coded identifier.

The method for positively identifying items provides a user information pertaining to the candidate item and the item being identified. In one embodiment, a user confirms that the candidate item is in fact the item being identified. In another embodiment, a plurality of candidate items is presented to a user to facilitate identifying the candidate item most resembling the visual characteristic of the item being identified. In one embodiment, the visual characteristic of the candidate item is stored within the database.

The method may include notifying a user whether the coded identifier of the item is associated with a candidate item. The method facilitates positively identifying an item through the combination of the coded identifier and a visual characteristic of the item.

Various elements of the present invention are combined into a system for positively identifying an item. In one embodiment, the system includes a checkout station comprising a reader configured to read a coded identifier of the item and a capture module configured to capture a visual characteristic of the item. The system further includes a server in communication with the checkout station, the server comprising an association module configured to associate the visual characteristic with a candidate item in a database and a verification module configured to verify that the candidate item is associated with the coded identifier. In selected embodiments, the server may be remote in relation to the checkout station, and may communicate with a plurality of checkout stations.

The present invention facilitates positively identifying an item by associating the coded identifier with a visual characteristic of the item. The present invention also notifies a user whether the coded identifier of the item is associated with a visual characteristic of the item.

The various elements and aspects of the present invention provide information regarding the identity of an item. The present invention increases customer service and reduces theft by positively identifying items and providing correct information regarding the items such as the price of the items. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, may be embodied in any suitable form, and may be organized within any suitable type of data structure. The operational data may be collected as a single data set, may be distributed over different locations, including over different storage devices, and may exist, at least partially, merely as electronic signals on a system or network.

Figure 2:
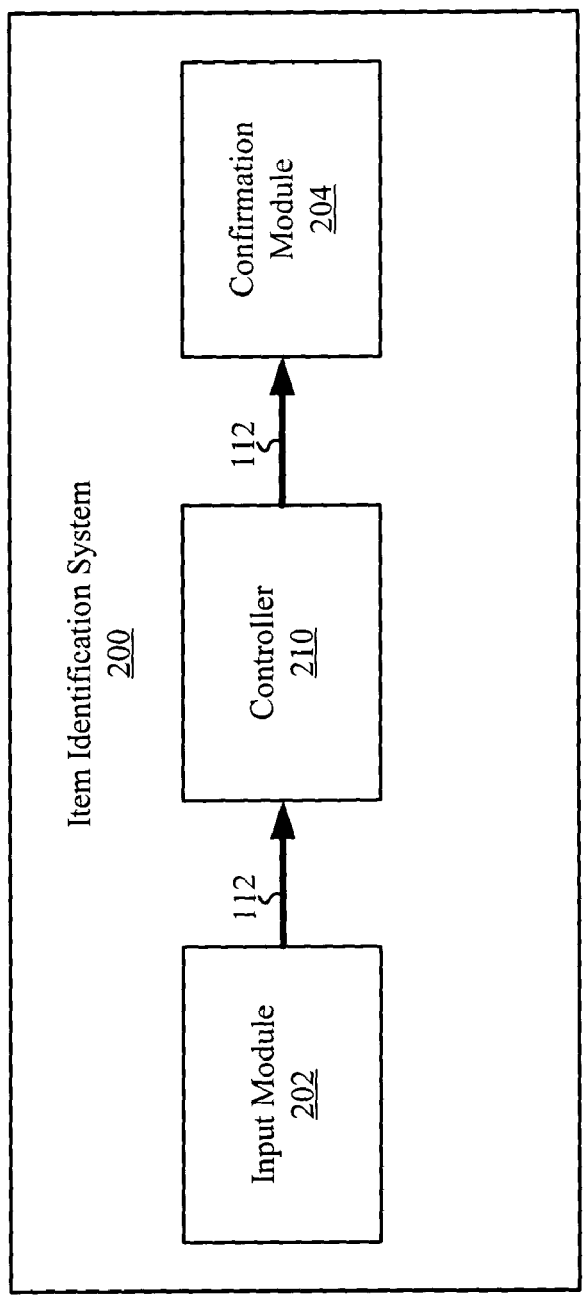
FIG. 2 is a block diagram illustrating an item identification system in accordance with the present invention.

FIG. 2 is a block diagram illustrating an item identification system 200 according to one embodiment of the present invention. The item identification system 200 comprises an input module 202, a controller 210, and a confirmation module 204. Preferably, the input module 202, the controller 210, and the confirmation module 204 communicate by way of a communications medium such as a network 112. The network 112 may be wireless or wired, and may cover a local, regional, or worldwide geographic area. Preferably, the network 112 is a wide-area-network and the controller 210 is remote in relation to the input module 202 and confirmation module 204.

The item identification system 200 uses one or more visual characteristics such as color, size, shape, or texture, as well as the coded identifier 104 to verify that the item 102 associated with the coded identifier 104 is the same item 102 that is being purchased. If the visual characteristics for the item 102 are associated with more than one candidate item, an operator may be presented with a list of candidate items. The operator may be prompted to assist in verifying that a candidate item associated with the coded identifier 104 is in fact the item 102 being purchased.

The input module 202 is configured to collect information regarding an item 102. In one embodiment, the information includes a visual characteristic and a coded identifier 104 for the item 102. The input module 202 is further configured to communicate the information regarding an item 102 to the controller 210.

The controller 210 is configured to associate the coded identifier 104 with information stored within a database 114. If a candidate item is found within the database 114, the controller 210 communicates information associated with the candidate item to a confirmation module 204. In one embodiment, the information includes the identity of the item 102. In another embodiment, the information sent to the confirmation module 204 includes pricing information for the item 102.

The confirmation module 204 is configured to prompt a user. In one embodiment, the confirmation module 204 prompts a user when visual characteristics for a plurality of candidate items may be associated with the item 102. In one embodiment, the confirmation module 204 includes a display monitor with a touch screen to enable interaction with a user.

The confirmation module 204 allows a user to select, from among a plurality of candidate items, a candidate item that most resembles the item 102.

Figure 1:
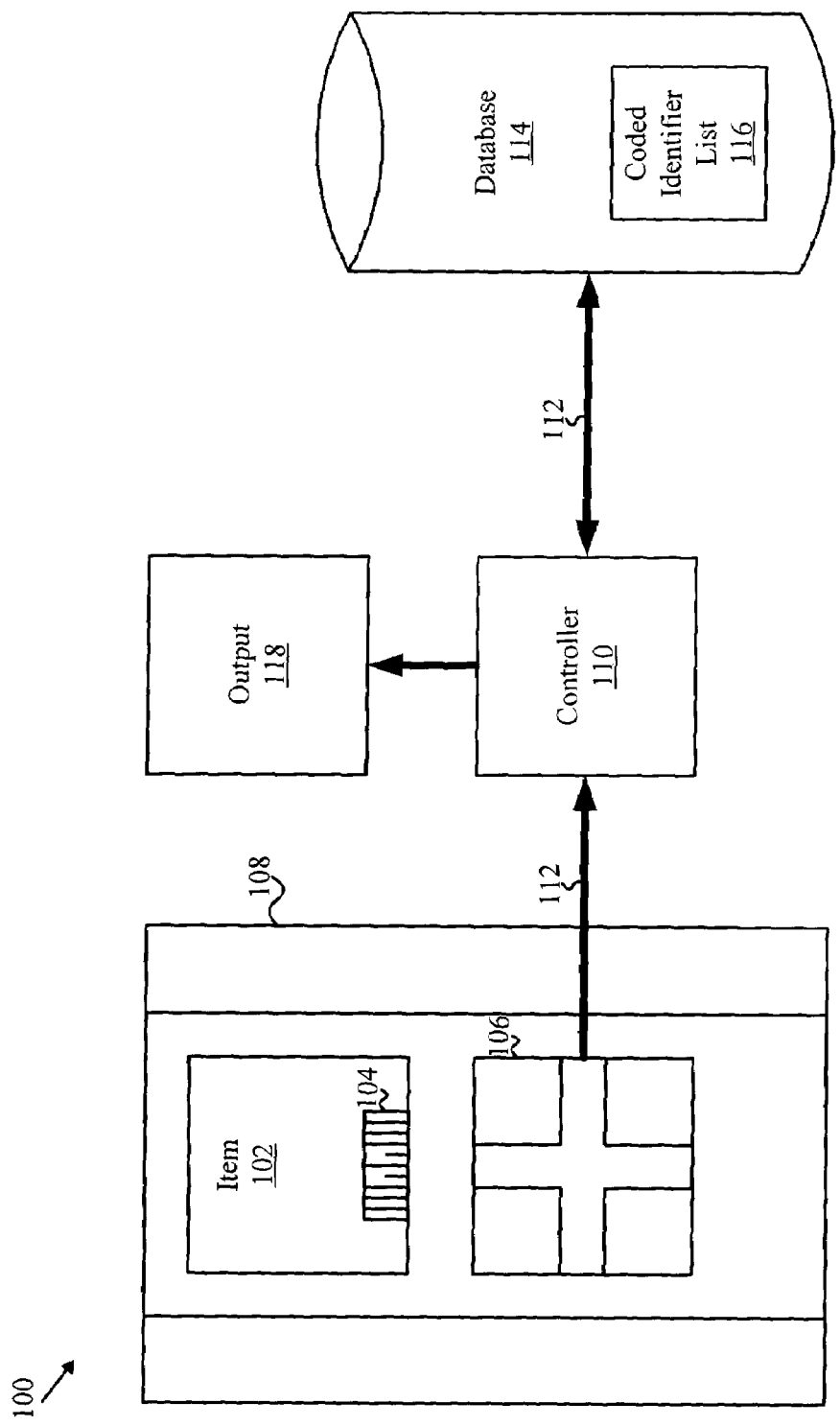
FIG. 1 is a block diagram illustrating a typical item identification system of the prior art.
Figure 3:
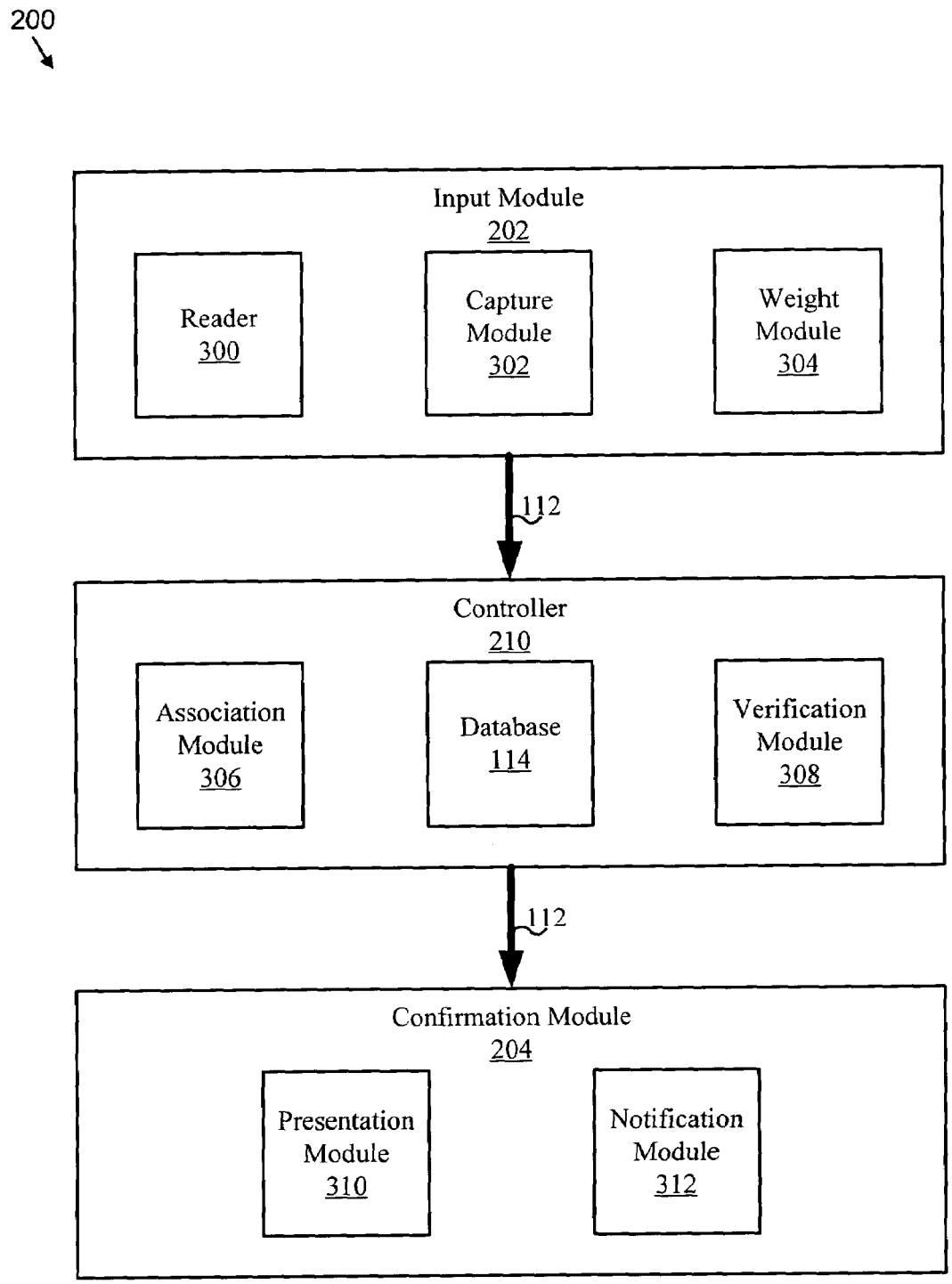
FIG. 3 is a schematic diagram illustrating specific elements of the item identification system of FIG. 2.

Referring now to FIG. 3, specific components of one embodiment of the item identification system 200 are illustrated in greater detail. The input module 202 collects information regarding an item 102 (of FIG. 1). The input module 202 includes a reader 300, a capture module 302, and a weight module 304.

In operation, the reader 300 reads a coded identifier 104 which may in one embodiment comprise a bar code affixed to an item 102. Thus, for instance, the reader 300 may read the coded identifier 104 using reflected laser light. Alternatively, the reader 300 may read a magnetic code representing the coded identifier 104 from a magnetic tag. Of course, the reader 300 may be implemented using any suitable technology for detecting a coded identifier 104 associated with the item 102.

The capture module 302 is configured to capture one or more visual characteristics of the item 102. The visual characteristics may comprise the color, size, shape, or texture of the item 102. The capture module 302 may comprise a camera, a video camera, a scanner, or the like. In one embodiment, the capture module 302 is integrated with the reader 300.

Preferably, when the item 102 is positioned in close proximity to the capture module 302, the capture module 302 determines one or more visual characteristics of the item 102 from an image or video clip taken of the item 102. The visual characteristics are determined from the image or video clip using algorithms well known to those of skill in the art.

In certain embodiments, the capture module 302 converts the one or more visual characteristics into a visual signature. The visual signature may be a unique identifier for the item 102 based on the brightness, hue, color saturation, color variation, size, shape, and other characteristics of the item 102. An algorithm may convert one or more visual characteristics into a unique visual signature. Other types of identification, mapping, and comparison techniques may also be used. Suitable examples include U.S. Pat. No. 6,434,257 entitled "Size Recognition System with Method for Determining Price of a Commodity," issued on Aug. 13, 2002, and commonly assigned; U.S. Pat. No. 6,310,964 entitled "Produce Size Recognition System," issued on Oct. 30, 2001, and commonly assigned; U.S. Pat. No. 6,005,959 entitled "Produce Size Recognition System," issued Dec. 21, 1999, and commonly assigned; and U.S. Pat. No. 5,546,475 entitled "Produce Recognition System," issued on Aug. 13, 1996, and commonly assigned. These patents are hereby incorporated by reference into this document.

In one embodiment, the system 200 includes a weight module 304 for registering the weight of the item 102. Of course, the weight module 304 may also be integrated with the reader 300. The weight of the item 102 may be used together with one or more visual characteristics and the coded identifier 104 to verify that the correct item 102 is identified.

The controller 210 receives the coded identifier 104 and one or more visual characteristics from the input module 202. Alternatively, the controller 210 may also receive the weight of the item 102 and the visual signature for the item 102. The controller 210 verifies the identity of the item 102. Preferably, the controller 210 searches a database 114 to identify the item 102. Of course, the database 114 may be local to the controller 210 or may communicate remotely with the controller 210.

The controller 210 in the depicted embodiment includes an association module 306, a verification module 308, and a database 114. The association module 306 associates one or more visual characteristics of the item 102 with a candidate item within the database 114. Preferably, the association module 306 searches the database 114 using one or more visual characteristics as search criteria. Alternatively, the association module 306 may use the coded identifier 104 as the primary search criteria. In yet another embodiment, the association module 306 searches the database 114 using both visual characteristics and the coded identifier 104 as search criteria. Depending on whether one or more candidate items are found in the database 114, the association module 306 may attempt repeated searches of the database 114 using alternative search criteria in order to provide as much information as possible about the item 102.

Once a candidate item is identified, the association module 306 associates the item 102 with information in the database 114 corresponding to the candidate item. Preferably, the association module 306 retrieves the coded identifier 104, one or more visual characteristics, and other information such as price from the database 114 for the candidate item. The coded identifier 104, one or more visual characteristics, and other information are provided to the verification module 308.

The verification module 308 verifies that the information regarding the item 102 corresponds to information for the candidate item selected from the database 114. In one embodiment, the verification module 308 verifies that the coded identifier 104 of the item 102 matches the coded identifier 104 of the candidate item. In addition, the verification module 308 may verify that one or more visual characteristics of the item 102 correspond to one or more visual characteristics for the identified candidate item.

The controller 210 sends the information regarding the item 102 to the confirmation module 204. The confirmation module 204 is configured to prompt a user when a plurality of candidate items are associated with one or more visual characteristics of the item 102. In one embodiment, the confirmation module 204, in conjunction with the presentation module 310, presents a candidate item that most resembles the item 102 to a user. The confirmation module 204 allows a user to confirm whether the presented candidate item does in fact correspond to the item 102. In another embodiment, the confirmation module 204, in conjunction with the presentation module 310, presents a list of images of candidate items that are associated with one or more visual characteristics of the item 102. The user may then select which of the candidate items corresponds to the item 102.

The confirmation module 204 in the depicted embodiment includes a presentation module 310 and a notification module 312. The presentation module 310 presents images of one or more candidate items to a user. In certain embodiments, as explained above, a plurality of candidate items may be identified in the database 114. The presentation module 310 presents the plurality of candidate items to a user. A user may then select the single candidate item that best resembles the visual characteristics of the item 102. In one embodiment, the presentation module 310 includes a display screen with a touch-sensitive display in order to present images of possible candidate items to the user.

In another embodiment, the presentation module 310 includes speakers configured to provide audio information regarding the visual characteristics of candidate items to the user. The audio information may include a description of the visual characteristics of each candidate item among the plurality of candidate items presented to a user. The audio information may further include the name of each candidate item presented to a user. The presentation of audio information enables a user to listen to information regarding each candidate item of the plurality of candidate items presented by the presentation module 310.

The notification module 312 notifies a user whether or not the item 102 was positively identified with a candidate item in the database 114. For example, as explained above, visual characteristics of the item 102 may correspond to visual characteristics of a candidate item, while the coded identifier 104 of the item 102 and the coded identifier 104 of the candidate item do not correspond. In such a case, the notification module 312 notifies a user that the coded identifier 104 of the item 102 maybe incorrectly affixed to the item 102. Such a notification may be provided in the form of a red flashing light. Alternatively, the notification module 312 may provide a text message to inform the user of the error. In certain embodiments, the notification is provided by way of an output device 118 such as a display screen and/or speaker.

Figure 4:
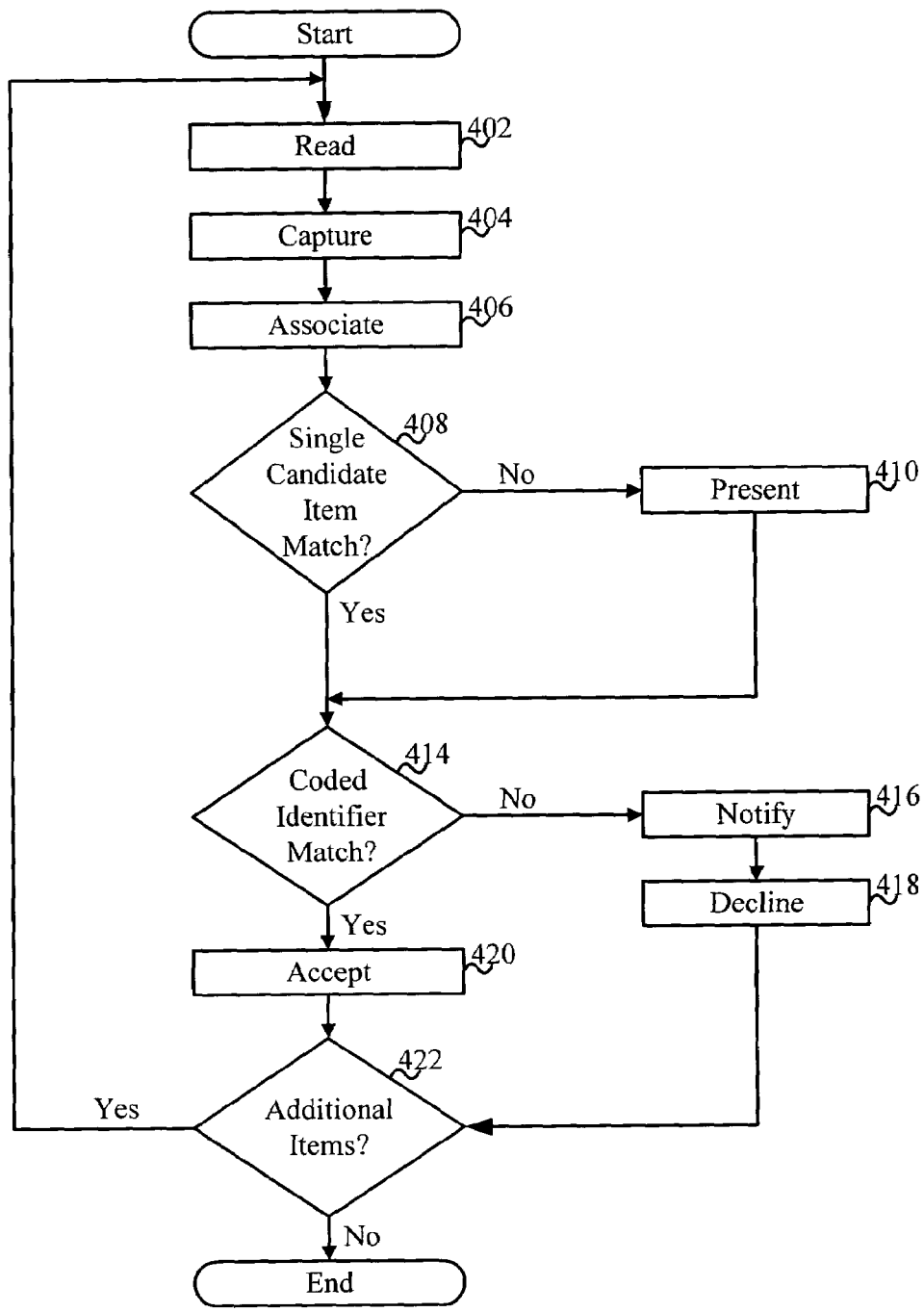
FIG. 4 is a flow chart diagram illustrating one embodiment of an item identification method of the present invention.

FIG. 4 illustrates a flow chart of a method 400 for positively identifying an item. Preferably, the method 400 is carried out at a retail checkout station such as a grocery store where a user of the system may be a customer or a store worker. Alternatively, the method 400 may be implemented in other systems where positive identification of coded items is required.

In one embodiment, the method 400 begins by reading 402 a coded identifier 104 affixed to an item 102. Typically, the coded identifier 104 is a bar code glued or otherwise affixed to the item 102. Alternatively, the coded identifier 104 may be a magnetic chip, stock keeping unit (SKU) number, or the like.

The method continues by capturing 404 a visual characteristic of the item 102. The visual characteristic may include the color, size, shape or texture of the item 102. In one embodiment, a visual signature is generated from one or more visual characteristics for the item 102. Next, an attempt is made to associate 406 the visual characteristic with one or more visual characteristics of a candidate item. Preferably, the one or more visual characteristics of the candidate item are stored in a database 114.

Next, the method 400 determines 408 whether the visual characteristic of the item 102 is associated with a single candidate item. If not, a plurality of candidate items are presented 410 to an operator. The operator may then select an appropriate candidate item.

Next, a determination 414 is made regarding whether the coded identifier 104 of the item 102 matches the coded identifier 104 associated with the candidate item. If there is a match, the item 102 is accepted 420 and information such as the item price is tallied. If there is not a match, the user is notified 416 of the mismatch and the item 102 or its associated transaction is declined 418 to prevent erroneous identification and handling of the item.

Finally, a determination 422 is made whether there are additional items to be identified. If so, the additional items are read 402 and the method continues as discussed above. If not, the method 400 ends. In this manner, the present invention provides a method 400 for positively identifying an item 102.

Figure 5:
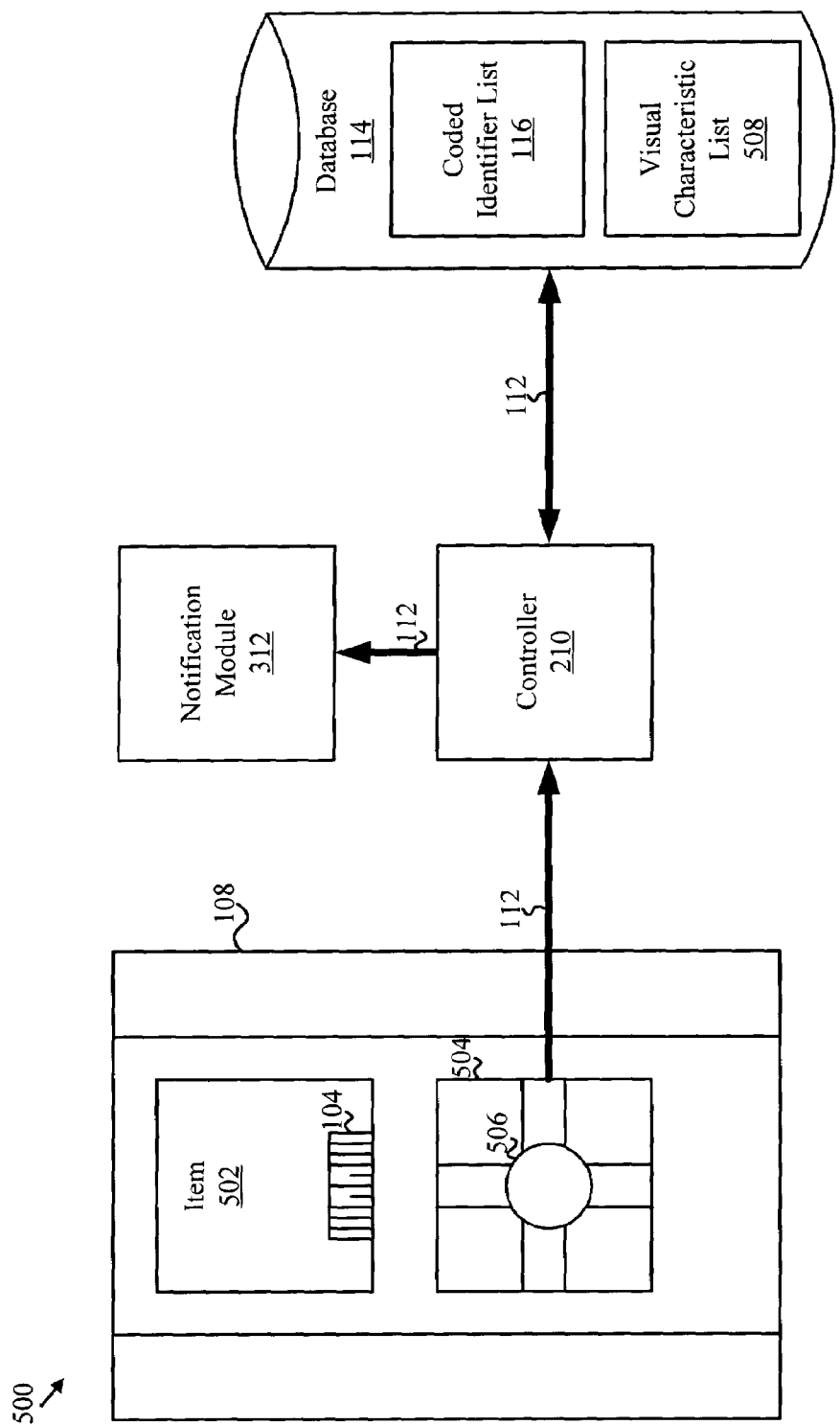
FIG. 5 is a block diagram illustrating one embodiment of an item identification system of the present invention.

FIG. 5 is a block diagram illustrating one example of an item identification system 500 in accordance with the present invention. The system 500 is one example of a system for implementing the method 400 described in relation to FIG. 4.

The system 500 includes an item 502, a reader 504, and a capture module 506. The capture module 506 may comprise a camera, a video camera, a scanner, or the like. To use the system 500, an item 502 having a coded identifier 104 is presented at a checkout station 108. The item 502 is placed near the reader 504 and capture module 506. The capture module 506 is configured to capture a visual characteristic of the item 502. In one embodiment, the capture module 506 takes a picture of the item 502. In certain embodiments, the capture module 506 captures a plurality of visual characteristics of the item 502. The reader 504 reads the coded identifier 104 of the item 502.

The visual characteristic determined by the capture module 506 and the coded identifier 104 are communicated to a controller 210. The reader 504, capture module 506, and the controller 210 communicate by way of a communications medium such as a network 112. The controller 210 searches a database 114 that may be integrated with the controller 210 or may be independent of the controller 210.

The database 114 comprises a coded identifier list 116 and a visual characteristic list 508. The visual characteristic list 508 comprises visual characteristics for a plurality of candidate items. The controller 210 searches the visual characteristic list 508 using the visual characteristic captured by the capture module 506. Preferably, the controller 210 finds a single candidate item for which the visual characteristic of the candidate item matches the visual characteristic of the item 502. Alternatively, the controller 210 may find a plurality of candidate items having at least one visual characteristic that matches the visual characteristic of the item 502. The plurality of candidate items may then be presented to a user by way of the confirmation module 204 and the presentation module 310 as discussed above. In one embodiment, images of each candidate item having at least one visual characteristic that matches one or more visual characteristics of the item 502 are presented to a user. A user may then select a single candidate item that most resembles the item 502.

In addition, the coded identifier list 116 comprises a plurality of coded identifiers 104 for a plurality of candidate items. The controller 210 searches the coded identifier list 116 using the coded identifier 104 as the search criteria. The controller 210 attempts to match the coded identifier 104 with a coded identifier from the list 116. The controller 210 verifies whether the coded identifier 104 is associated with the selected candidate item.

The controller 210 communicates with a notification module 312. The notification module 312 notifies a user whether of not the item 502 is properly associated with the coded identifier 104. In one embodiment, the notification module 312 notifies the user by sending a signal to an output device. The output device may comprise a green light that is activated when the coded identifier 104 is positively associated with the item 102. Additionally, when the coded identifier 104 is not positively associated with the item 102, a red light may be activated. Of course, the output device may also comprise a bell, a text massage, a tone, or any other suitable indicator. In this manner, the system 500 facilitates positively identifying an item 502 by associating a coded identifier 104 and a visual characteristic of an item 502 with a coded identifier and visual characteristic of a candidate item within a database 114. Processing of items may be conducted more quickly with the present invention and may be done without the constant attention of an attendant. Fraud may be effectively thwarted, allowing transeactions such as product check-out to be more streamlined and secure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for positively identifying an item, the apparatus comprising:
    a processor configured to execute executable data structures; and
    a memory device connected to the processor for storing the executable data structures, the executable and operational data structures comprising:
        a reader module configured to read a coded identifier associated with the item;
        a capture module configured to capture a visual characteristic of the item, independent of the coded identifier, and convert the visual characteristic into a visual signature based on brightness, hue, color saturation, and color variation;
        an association module configured to identify the item in a database based on the coded identifier;
        a verification module configured to verify the identity of the item based on the visual signature;
        a presentation module configured to provide audio information describing one or more visual characteristics of an item associated with the coded identifier such that a user can detect a mismatch between the coded identifier and the item to facilitate fraud detection; and
        a confirmation module configured to receive a confirmation selection from the user confirming that the visual characteristic of the item matches the audio information.

2. The apparatus of claim 1, the presentation module further configured to present to the user a plurality of candidate items with visual signatures matching the visual signature of the item and enable the user to identify the item from the plurality of candidate items.

3. The apparatus of claim 1, the executable and operational data structures further comprising a notification module configured to notify the user whether the coded identifier is associated with the item.

4. The apparatus of claim 1, the executable and operational data structures further comprising a weight module configured to identify the item based on its weight.

5. The apparatus of claim 1, wherein the visual characteristic is selected from the group consisting of color, size, shape, and texture.

6. A user interface for positively identifying an item, the user interface comprising:
    an input module configured to read a coded identifier associated with the item and to capture a visual characteristic associated with the item, the visual characteristic captured independent of the coded identifier;
    a controller in communication with the input module, the controller configured to receive the coded identifier and the visual characteristic from the input module, identify the item in a database based on the coded identifier, convert the visual characteristic into a visual signature based on brightness, hue, color saturation, and color variation, and verify the identity of the item based on the visual signature; and
    a confirmation module in communication with the controller, the confirmation module configured to confirm that the identity of the item by way of audio information describing one or more visual characteristics of an item associated with the coded identifier such that a user can detect a mismatch between the coded identifier and the item to facilitate fraud detection, and receive a confirmation selection from the user confirming that the visual characteristic of the item matches the audio information.

7. The user interface of claim 6, the presentation module further configured to present to the user a plurality of candidate items with visual signatures matching the visual signature of the item and enable the user to identify the item from the plurality of candidate items.

8. The user interface of claim 6, further comprising a notification module configured to notify the user whether the item is associated with the coded identifier.

9. The user interface of claim 6, wherein the input module identifies the item based on its weight.

10. A system for positively identifying an item, the system comprising:
   a checkout station, comprising:
      a processor configured to execute executable data structures; and
      a memory device connected to the processor for storing the executable data structures, the executable and operational data structures comprising:
         a reader module configured to read a coded identifier of the item; and
         a capture module configured to capture a visual characteristic of the item, the visual characteristic captured independent of the coded identifier, and convert the visual characteristic into a visual signature based on brightness, hue, color saturation, and color variation; and
         a presentation module configured to provide audio information describing one or more visual characteristics of an item associated with the coded identifier such that a user can detect a mismatch between the coded identifier and the item to facilitate fraud detection;
         a confirmation module configured to receive a confirmation selection from the user confirming that the visual characteristic of the item matches the audio information; and
      a server in communication with the checkout station, the server comprising:
         an association module configured to identify the item in a database based on the coded identifier; and
         a verification module configured to verify the identity of the item based on the visual signature.

11. The system of claim 10, wherein the server is remote in relation to the checkout station.

12. The system of claim 10, wherein the server communicates with a plurality of checkout stations.

13. A method for positively identifying an item, the method comprising:
   reading a coded identifier associated with the item;
   capturing a visual characteristic of the item, the visual characteristic captured independent of the coded identifier;
   capturing the visual characteristic into a visual signature based on brightness, hue, color saturation, and color variation;
   identifying the item in a database based on the coded identifier;
   providing audio information describing one or more visual characteristics of an item associated with the coded identifier such that a user can detect a mismatch between the coded identifier and the item to facilitate fraud detection;
   receiving a confirmation selection from the user confirming that the visual characteristic of the item matches the audio information; and
      verifying the identity of the item based on the visual signature.

14. The method of claim 13, further comprising presenting to the user a plurality of candidate items with visual signatures matching the visual signature of the item and enabling the user to identify the item from the plurality of candidate items.

15. The method of claim 13, further comprising notifying the user whether the coded identifier is associated with the item.

16. The method of claim 13, further comprising identifying and associating the weight of the item with the weight of the candidate item.

17. The method of claim 13, wherein the visual characteristic is selected from the group consisting of color, size, shape, and texture.

18. An apparatus for positively identifying an item, the apparatus comprising:
   means for reading a coded identifier associated with the item;
   means for capturing a visual characteristic of the item, the visual characteristic captured independent of the coded identifier;
   means for converting the visual characteristic into a visual signature based on brightness, hue, color saturation, and color variation;
   means for identifying the item in a database based on the coded identifier;
   means for providing audio information describing one or more visual characteristics of an item associated with the coded identifier such that a user can detect a mismatch between the coded identifier and the item to facilitate fraud detection;
   receiving a confirmation selection from the user confirming that the visual characteristic of the item matches the audio information; and
   means for verifying the identity of the item based on the visual signature.

19. The apparatus of claim 18, further comprising means for notifying the user whether the coded identifier is associated with the item.

20. An article of manufacture comprising a program storage medium readable by a processor and embodying one or more instructions executable by a processor to perform a method for positively identifying an item, the method comprising:
   reading a coded identifier associated with an item;
   capturing a visual characteristic of the item, the visual characteristic captured independent of the coded identifier;
   converting the visual characteristic into a visual signature based on brightness, hue, color saturation, and color variation;
   identifying the item in a database based on the coded identifier;
   providing audio information describing one or more visual characteristics of an item associated with the coded identifier such that a user can detect a mismatch between the coded identifier and the item to facilitate fraud detection;
   receiving a confirmation selection from the user confirming that the visual characteristic of the item matches the audio information; and
   verifying the identity of the item based on the visual signature.

21. The article of manufacture of claim 20, wherein the method further comprises presenting to the user a plurality of candidate items with visual signatures matching the visual signature of the item and enabling the user to identify the item from the plurality of candidate items the item.

22. The article of manufacture of claim 20, wherein the method further comprises notifying the user whether the coded identifier is associated with the item.

* * * * *